(12) United States Patent
Brülle-Drews et al.

(10) Patent No.: US 8,170,795 B2
(45) Date of Patent: May 1, 2012

(54) NAVIGATION SYSTEM WITH ANIMATED INTERSECTION VIEW

(75) Inventors: Christian Brülle-Drews, Hamburg (DE); Volker Grabs, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1362 days.

(21) Appl. No.: 11/462,306

(22) Filed: Aug. 3, 2006

(65) Prior Publication Data

US 2007/0192020 A1      Aug. 16, 2007

Related U.S. Application Data

(63) Continuation-in-part of application No. 11/335,910, filed on Jan. 18, 2006, now abandoned.

(30) Foreign Application Priority Data

Jan. 18, 2005   (EP) .................................... 05000943

(51) Int. Cl.
*G08G 1/123* (2006.01)
*G08G 1/137* (2006.01)
*G01C 21/00* (2006.01)
*G06F 17/10* (2006.01)
*G06F 9/52* (2006.01)

(52) U.S. Cl. ... 701/431; 701/436; 701/437; 340/995.14; 340/995.2; 340/995.27

(58) Field of Classification Search .......... 340/988–990, 340/994, 995.1, 995.14, 995.17, 995.18, 340/995.19, 995.2, 995.26, 995.27, 995.28; 701/1, 200, 204, 206, 207, 208, 209, 210, 701/211, 212, 213, 300, 400, 408–410, 430, 701/431, 436, 437, 454, 532

See application file for complete search history.

(56) References Cited

U.S. PATENT DOCUMENTS

| 6,597,354 | B2 | 7/2003 | Sakamoto et al. |
| 6,611,753 | B1 | 8/2003 | Millington |
| 2003/0154021 | A1 | 8/2003 | Delling et al. |
| 2003/0214582 | A1 | 11/2003 | Takahashi et al. |

FOREIGN PATENT DOCUMENTS

| DE | 199 35 718 A1 | 2/2001 |
| EP | 0 579 451 A1 | 1/1994 |
| EP | 1 024 347 A1 | 8/2000 |
| EP | 1 024 467 A2 | 8/2000 |
| EP | 1 241 445 A2 | 9/2002 |
| JP | 2004086508 | 3/2004 |

*Primary Examiner* — Jack W Keith
*Assistant Examiner* — Edward Pipala

(57) ABSTRACT

A vehicle navigation system helps guide a driver to a destination by enhancing visualization of upcoming intersections. The navigation system stores animation data that depicts the intersection as it will appear to the driver. The animation data may be a sequence of images (e.g., digital camera images) taken at intervals before and after the intersection. The navigation system may show the images in synchronism with the progress of the vehicle to provide an animated display of the intersection for the driver. The animated display aids the driver with following a recommended navigation route to the destination.

16 Claims, 10 Drawing Sheets

US 8,170,795 B2

NAVIGATION SYSTEM WITH ANIMATED INTERSECTION VIEW

PRIORITY CLAIM

This application is a continuation-in-part of U.S. patent application Ser. No. 11/335,910, filed Jan. 18, 2006 now abandoned, which claims the benefit of priority from European Patent Application No. 05000943.0, filed Jan. 18, 2005, both of which are incorporated by reference herein.

BACKGROUND OF THE INVENTION

1. Technical Field

This invention relates to a vehicle navigation system that displays views of intersections. In particular, the invention relates to a navigation system that provides an animated view of upcoming intersections.

2. Related Art

Navigation systems are increasingly prevalent in vehicles. A navigation system analyzes position data provided by Global Positioning System (GPS) satellites and received by an on-board GPS sensor. The navigation system may also analyze position or motion data obtained from other sources, including motion sensors and digital maps, to determine the position and velocity of the vehicle.

The navigation system displays a detailed digital map for the driver. In addition to the vehicle location, the map may include cartographic features, such as streets, buildings, rivers, gas stations, restaurants, landmarks and other points of interest. A compact disk or digital video disk may store the cartographic data for display on the map.

The navigation system may also display routes to destinations and the maneuvers (e.g., turns or merges) needed to reach the destination. As the vehicle changes position, a vehicle position mark on the map changes to reflect the updated vehicle position. Alternatively, the digital map may be scrolled, while the vehicle position mark may be fixed at a predetermined position.

To help the driver identify the proper route, some navigation systems provide enlarged views of intersections where the driver should turn in order to reach the destination. Other navigation systems provide three-dimensional perspective views of the intersections. In some systems, the map displays the intersection approached by the vehicle at an angle which varies depending on the complexity of the intersection.

However, in such systems, the complexity of the road geometry in the forward path of the vehicle may cause orientation difficulties for the driver. For both two- and three-dimensional representations, it may be difficult for the driver to keep proper orientation and the driver may become confused by the displayed digital map. Driver confusion may increase with increasing complexity of the intersections, particularly when roads intersect at different height levels or run in rotary turns with other roads in close proximity. In addition, when the navigation system provides a driver with an enlarged perspective view of the intersection from a standpoint which differs from the actual position of the vehicle, the driver may need time to become properly oriented. The time consumed by the orientation process may lead to missed turns, increased travel time, and other undesirable results.

Therefore, a need exists for a vehicle navigation system which provides improved visualization of upcoming intersections.

SUMMARY

A vehicle navigation system improves the visualization of upcoming intersections for the driver. The navigation system includes a location system which determines vehicle location and speed, a navigation database which stores road characteristic data, and an intersection view database which stores perspective view data of intersections. The navigation system also includes an animation database containing animation data of intersection views, and an animation player which plays the animation data.

The navigation system may process input from a GPS receiver, speed sensor, gyroscope, or other motion or location information device in the location system. When the navigation system determines that the vehicle is approaching an intersection, the navigation system retrieves intersection animation data for the intersection from the animation database. The animation player displays the animation data for the driver on the display, including display layers containing static image data.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
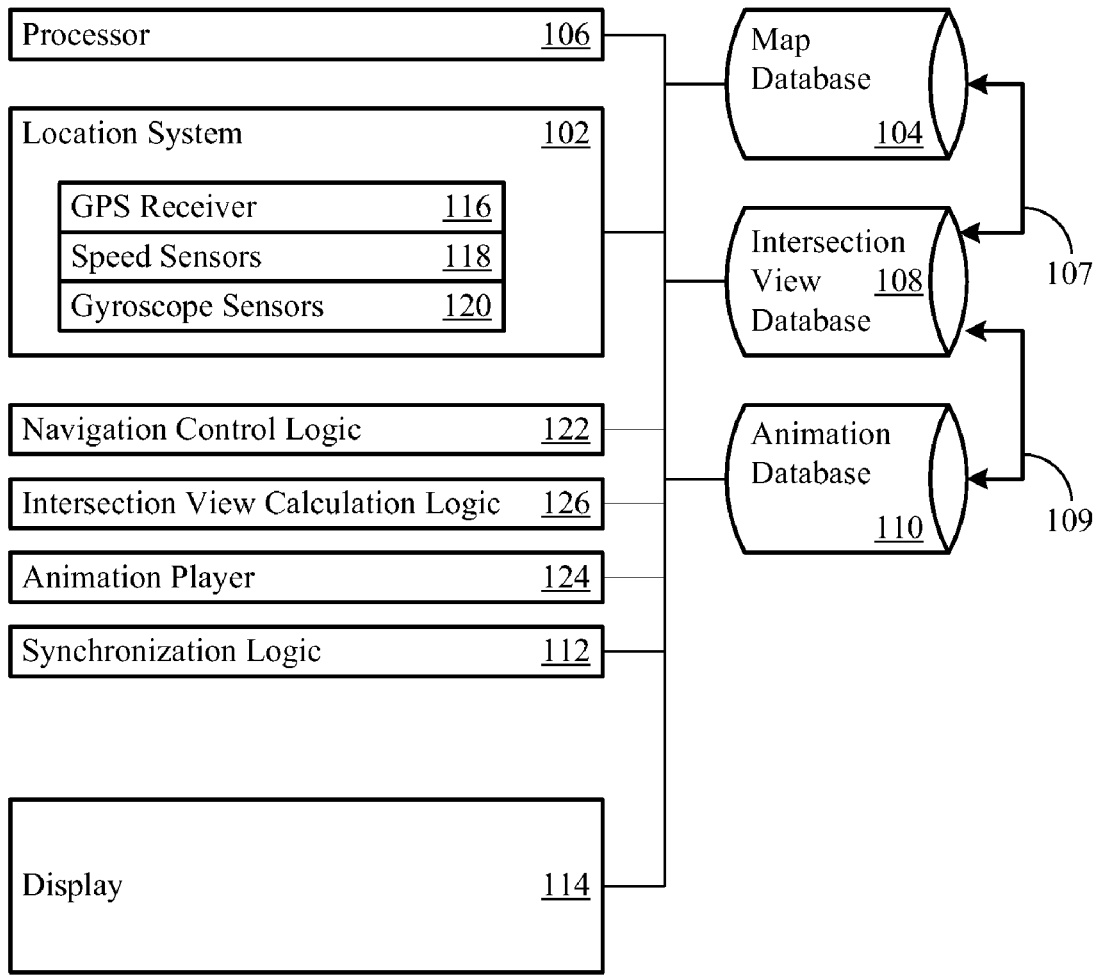
FIG. 1 illustrates a navigation system.

In FIG. 1, a navigation system 100 may provide improved visualization of upcoming intersections. The navigation system 100 may include a location system 102, a map database 104, and a processor 106. The map database 104 may include location data for roads, intersections, junctions, landmarks, curves, points of interest (POI), and/or other geographical or cartographic information. In addition, an intersection view database 108 stores visual representations of intersections, an animation database 110 stores animated intersection views, and synchronization logic 112 may be provided to synchronize an animated intersection view on the display 114 with the position and/or speed of the vehicle.

The location system 102 may include a GPS receiver 116 that receives location information transmitted from GPS satellites, speed sensors 118, and gyroscope sensors 120. The speed sensors 118 may include ABS wheel sensors or other speed sensors. The gyroscope sensors 120 may include a piezoelectric sensor with a detecting crystal vibrating in a plane and which measures rotation of the vehicle around an axis (e.g., an axis perpendicular to the road). The location system 102 provides location data which assists the navigation system 100 to determine whether the vehicle is approaching an intersection.

The navigation system 100 may implement filters, such as a Kalman filter, to help reduce operational errors in the sensor output, or to combine the sensor outputs to compensate for errors or improve measurement accuracy. The location system 102 may include other types of sensors, such as geomagnetic sensors or angle sensors that measure the steering angle of the vehicle. The navigation system 100 may employ map matching with the data provided by the location system and the map database 104, thereby locating the vehicle on the map.

One or more processors 106 process the information provided by the location system 102 and the map database 104. Navigation control logic 122 may locate the vehicle with respect to the maps in the map database 104, may perform route planning, and may provide the driver with route directions. When more than one processor 106 is available, the processors may share memory that is locally or remotely interfaced with the processors. The memory may include non-volatile memory such as electrically erasable read-only memory (EEPROM), or Flash memory, volatile memory such as dynamic random access memory (DRAM), a hard disk, digital versatile discs (DVD), compact disc (CD), magneto-optical disks, or other types of memory.

The map database 104 may include database references 107 to intersection view data stored in the intersection view database 108. The intersection view database 108 may include bitmap images of intersection views as well as bitmap images for different road geometries, a skyline and a sky (e.g., with the illumination depending on the local time), street names, information about the position at which the navigation cursor is located (e.g., the current vehicle location), or other information. The intersection views may include three-dimensional or two-dimensional renderings of an intersection, including related intersection features, buildings, points of interest, topographical or geographical characteristics, or renderings of other features.

When the vehicle approaches an intersection, as determined by the location system 102, the navigation system 100 may provide a representation of the intersection using image data provided by the intersection view database 108. Alternatively, the image data may be included in the map database 104 or the animation database 110 instead of, or in addition to, the intersection view database 108.

The intersection view database 108 may include database references 109 to the animation database 110. The references 109 may link an intersection representation in the view database to animation data for the intersection. The animation data may include a sequence of image data, such as a sequence of bitmap images (e.g., digital photographs taken at a sequence of distances before and/or after the intersection). The image data may be in other formats, including vector graphics, metafiles (e.g., combined bitmaps and vector graphics), or other formats. The animation data may include a temporal sequence of individual static images (e.g., individual image frames). The static images may show the forward path of the vehicle, the intersecting roads in front of the vehicle, or other visual cues which the driver would see as the vehicle moves forward. The navigation system 100 may control the animation speed based on the location and speed of the vehicle. The animation data may show perspective views of the approaching intersection, including the number of lanes, any slopes, branches, crossroads, or other features. The animation data may also include topographical objects such as bridges and buildings, signposts and environmental views (e.g., representing an urban, rural or industrial environment or a mountain landscape), or other features in the environment.

The synchronization logic 112 may synchronize the animation player 124 with the position and speed of the vehicle. The synchronization logic 112 may include timer and/or comparison logic for synchronizing the vehicle position with the frames of the animation data. For example, if successive animation frames represent intersection views which are 100 feet apart in distance, the synchronization logic 112 may display a new animation frame every time the vehicle moves forward 100 feet. The processor 106 and synchronization logic 112 determine which image or images of the animation data to display at which time to generate the animated view of the intersection for driver in keeping with the position of the vehicle. The animation of the intersection helps the driver successfully traverse the route to the destination, with the animation matching the actual view through the window.

The intersection view calculation logic 126 may include location comparison logic which process the data provided by the location system 102 to determine which intersection is upcoming. The intersection view calculation logic 126 may also interface with the animation database 110 to obtain the animation data for an upcoming intersection. The intersection view calculation logic 126 may also animate static images provided by the animation database 110, the intersection view database 108, and/or the map database 104.

The animation data may be provided in Audio Video Interleaved (AVI) format, Motion Pictures Experts Group (MPEG) format, or other video format. The animation player 124 may be an AVI, MPEG, or other movie player, or may be a static image player which can play individual images which constitute the animation data. The animation data starts and ends at predetermined positions ahead and behind of the intersection. The animation player 124 may then be synchronized with the data provided by the location system 102 to show frames of the animation data at the appropriate times. Thus, the elapsed time or running time of the animation data, and the distance covered in the animation data, may be synchronized with the driven distance. The display 114 thereby provides an animation of approaching the intersection in synchronism with the vehicle position. The view shown on the display 114 may be a geographical section of the image data available in the databases 104, 108, and 110. The section may be a segment (e.g., across an angle of about 1-180 degrees, for example across 90 degrees) of a circle (e.g., of radius 1-20 km, for example 10 km). The section may approximately correspond to the visual angle of human eyesight at the horizon.

The display 114 may show other information in addition to the animation data. The additional information may be shown using static bitmaps or other image data. The composite view shown on the display 114 may be implemented with multiple concurrently displayed layers. The concurrently displayed layers may include a layer for static bitmap image data, a layer for animation data, or layers for other types of image data.

Figure 2:
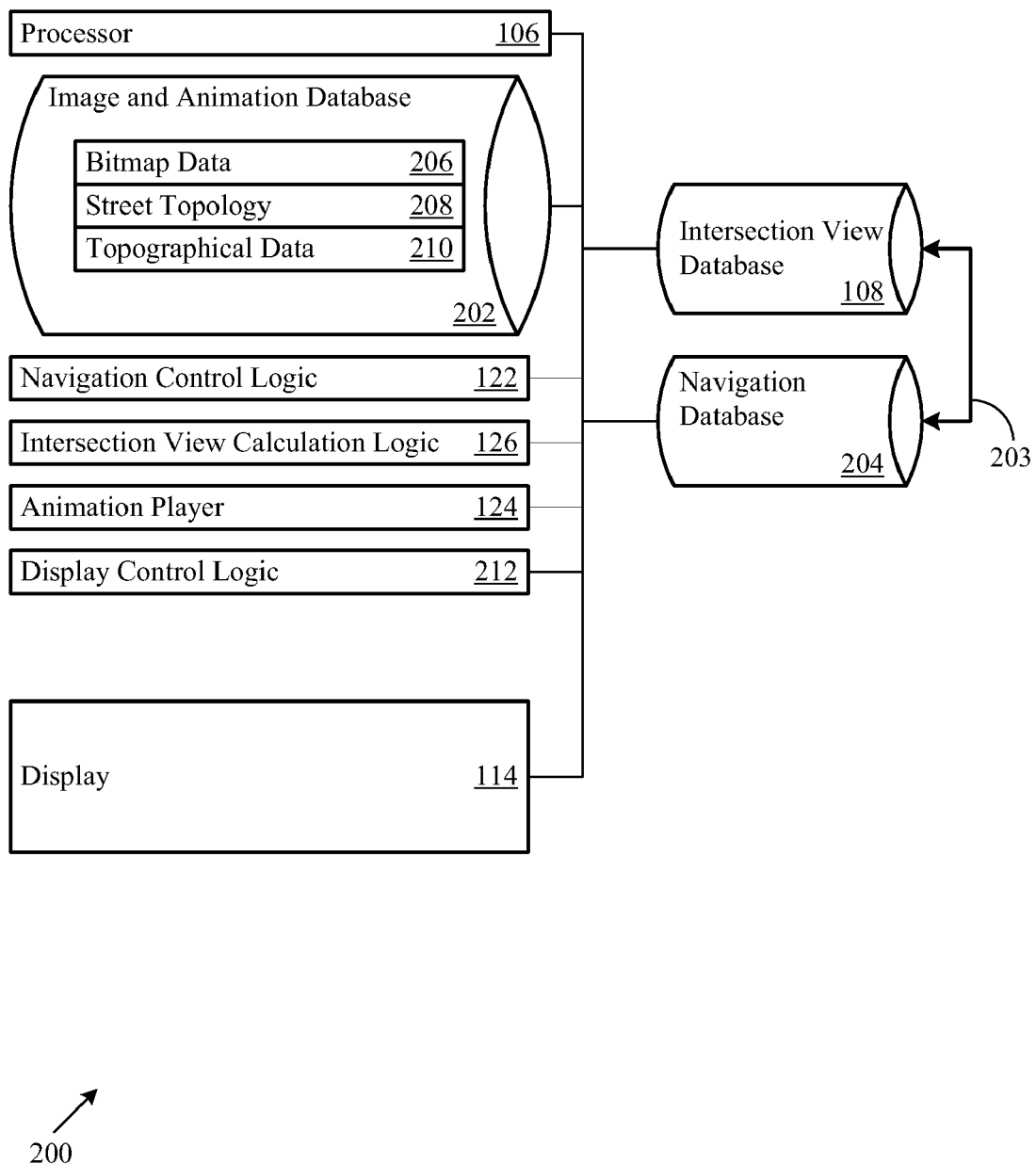
FIG. 2 illustrates a navigation system.

FIG. 2 illustrates a navigation system 200, including a processor 106, a navigation database 204, an intersection view database 108, and an image and animation database 202. The navigation system 200 obtains image data from the databases 108, 202, and 204 and synthesizes views for the driver on the display 114. The navigation database 204 includes location and motion data provided by a GPS receiver, motion sensors, or other location or motion information sources, as well as a digital navigation map. The navigation control logic 122 determines the position and speed of the vehicle using the location and motion data. The intersection view calculation logic 126 interfaces with the image and animation database 202 to obtain the animation data for an intersection. The navigation database 204 may include database references 203 to data in the intersection view database 108. The database references 107, 109, and 203 may include pointers, database fields with external references, or other references to data in the databases 104, 108, 110, and 204.

The intersection view database 108 may include information about the underlying road geometry, and references to bitmaps and animation data to be displayed. Additional information about the intersections, such as street names, buildings, points of interest, or other geographical or topographical information may also be included in the intersection view database 108. The intersection view database 108 may include bitmaps representing road geometries, skylines, and the sky. The intersection view database 108 may include references to the animation data stored in the images and animation database 250 for intersections.

The image and animation database 202 includes bitmap data 206 of one or more parts of the route traveled by the vehicle. The bitmap data 206 may represent three dimensional views of portions of the route, including the traffic lanes which make up the route. The bitmap data 206 may also represent topographical objects, such as bridges, buildings, (e.g., emergency and administrative buildings), or other points of interest. The bitmap data 206 may also represent signposts, roadway information signs, traffic lights, beacons, pedestrian crossings, or images representing other objects which may be encountered along the route.

Additional animation data stored in the image and animation database 202 may include the street topology animation data 208 and the topographical animation data 210. The street topology data 208 may represent image data for roads, intersections, and other roadway features, while the topographical data 210 may represent image data for other types of features (e.g., buildings, natural geography features, and points of interest). The street topology animation data 208 and/or topographical data 210 may include individual images. The images may be bitmaps, vector graphics, metafiles, or other types of image data. Alternatively, the street topology animation data 208 and/or topographical data 210 may include animated bitmaps obtained from the bitmap data 206 of the image and animation database 202.

The processor 106 may determine the position and speed of the vehicle. When the vehicle approaches an intersection, the processor 106 may also determine a perspective intersection view. The view may be represented by image data in the intersection view database 108 and/or the image and animation database 202. The processor 106 may compare the information about the actual position of the vehicle with the information provided by the navigation database 205 and/or the intersection view database 108 to determine the actual perspective view to be displayed. If street topology animation data 208 and topographical animation data 210 are available for the intersection approached by the vehicle, the animation player 124 may mix or combine the representative bitmap images 206 and animation data 208 and 210 for presentation on the display 114.

The navigation system 200 may include separate display control logic 212. The display control logic 212 controls the combined display of multiple individual display layers. The navigation system 100 may place animation data, bitmap data, or other types of data on any given display layer. Thus, each display layer may include static images (e.g., bitmap images 206), animation data 208 and 210 (e.g., AVI frames from a sequence of AVI frames), or other types of data. The display layers may include, for example, a bitmap representation of the sky, a bitmap representation of a skyline, the road geometry including relevant details as a synchronized animation, and signposts as static bitmaps. The display control logic 212, the animation player 124, or the synchronization logic 112 may synchronize the animation data 208 and 210 with the information about the position and speed of the vehicle provided by the navigation database 204. Accordingly, the display 114 shows the animated view of the approaching intersection, synchronized with the motion of the vehicle.

Figure 3:
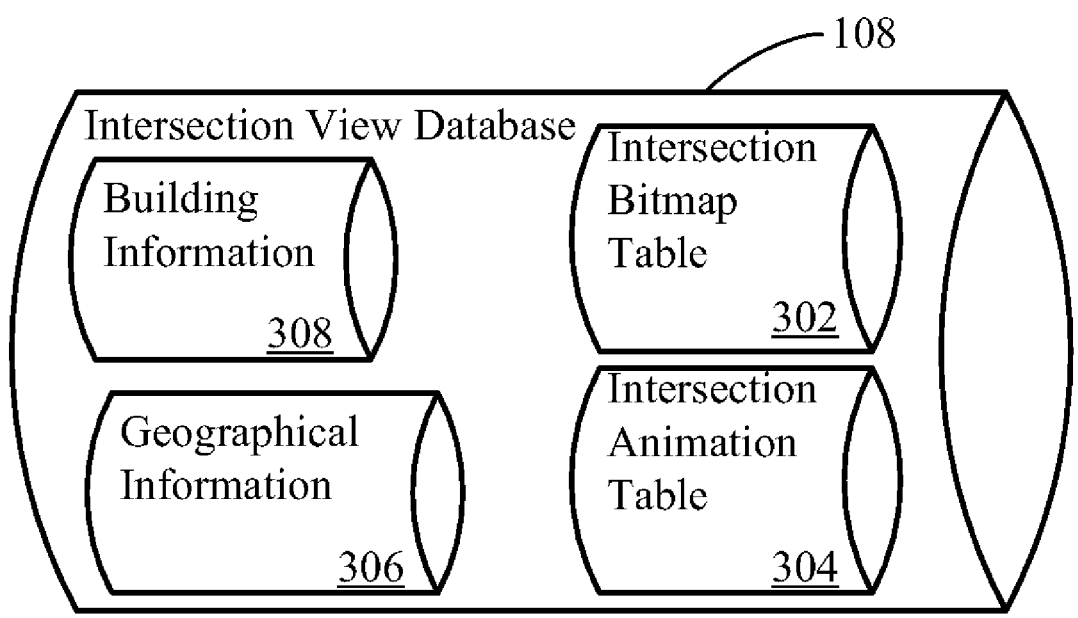
FIG. 3 illustrates an intersection view database.

FIG. 3 illustrates an example intersection view database 108. The intersection view database 108 may include an intersection bitmap table 302, an intersection animation table 304, a geographical information table 306, and a building information table 308. The intersection bitmap table 302 may include bitmaps and/or pointers to bitmaps (or any other graphical representation) representing road geometries, skylines, and the sky. The intersection animation table 304 may include animation information and/or pointers to animation data for the underlying road geometry, and references to bitmaps and animation data to be displayed. The intersection animation table 304 may include information and/or pointers to information related to frame displays, such as frame formatting, size, resolution, color depth, brightness, and contrast, video file links, and sequence data, and may include references to the animation data stored in the images and animation database 110 for intersections. The geographical information table 306 may include information and/or pointers to information about the intersections, such as street names, buildings, points of interest, or other geographical or topographical information. The building information table 308 may include information and/or pointers to information about building types, locations, size, topology information, building features and amenities, and other building data.

Figure 4:
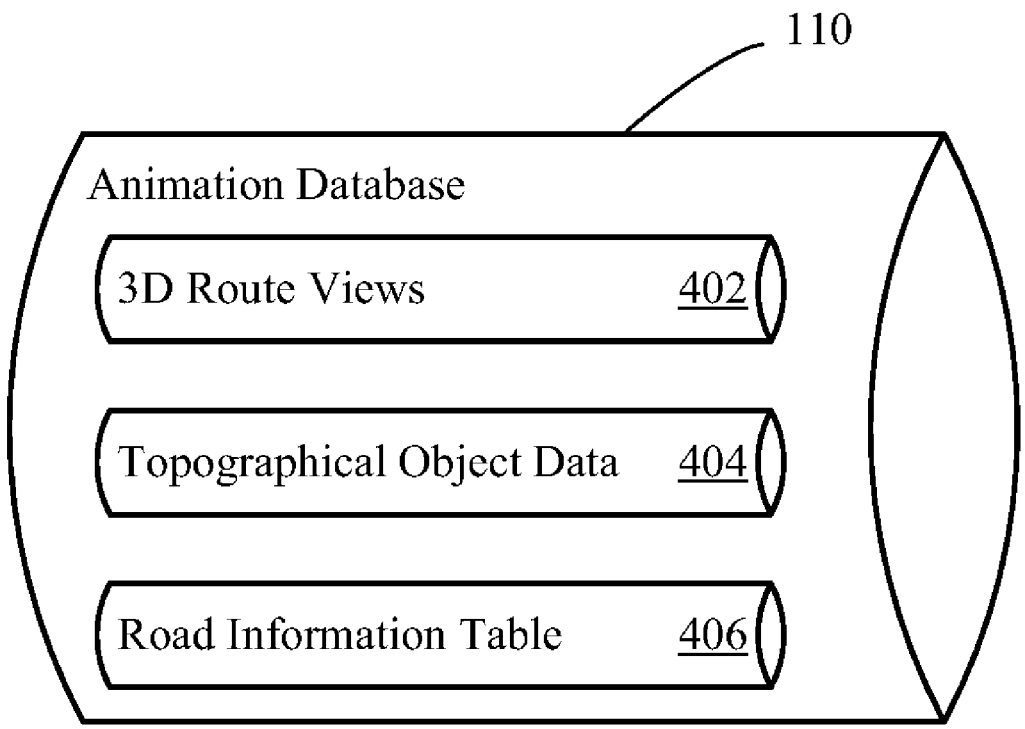
FIG. 4 illustrates an animation database.

FIG. 4 illustrates an example animation database 110. The animation database 110 may include a three-dimensional route view table 402, a topographical object table 404, and a road information table 406. The three-dimensional route view table 402 may include three-dimensional data and/or pointers to three dimensional data representing one or more parts of the route traveled by the vehicle. The data in the three-dimensional route view table 402 may represent three dimensional views and/or pointers to three dimensional views of portions of the route, including the traffic lanes which make up the route. The three-dimensional route view table 402 may include three-dimensional animation sequence information and/or pointers to animation sequence information for displaying the route or parts of the route, including frame sequences, video file data, or timing data. The topographical object table 404 may include data and/or pointers to data related to topographical objects, such as bridges, buildings, (e.g., emergency and administrative buildings), or other points of interest. The topographical object table 404 may include animation sequence information and/or pointers to animation sequence information to display the objects. The road information table 406 may include data and/or pointers to data representing signposts, roadway information signs, traffic lights, beacons, pedestrian crossings, or images representing other objects which may be encountered along the route.

Figure 5:
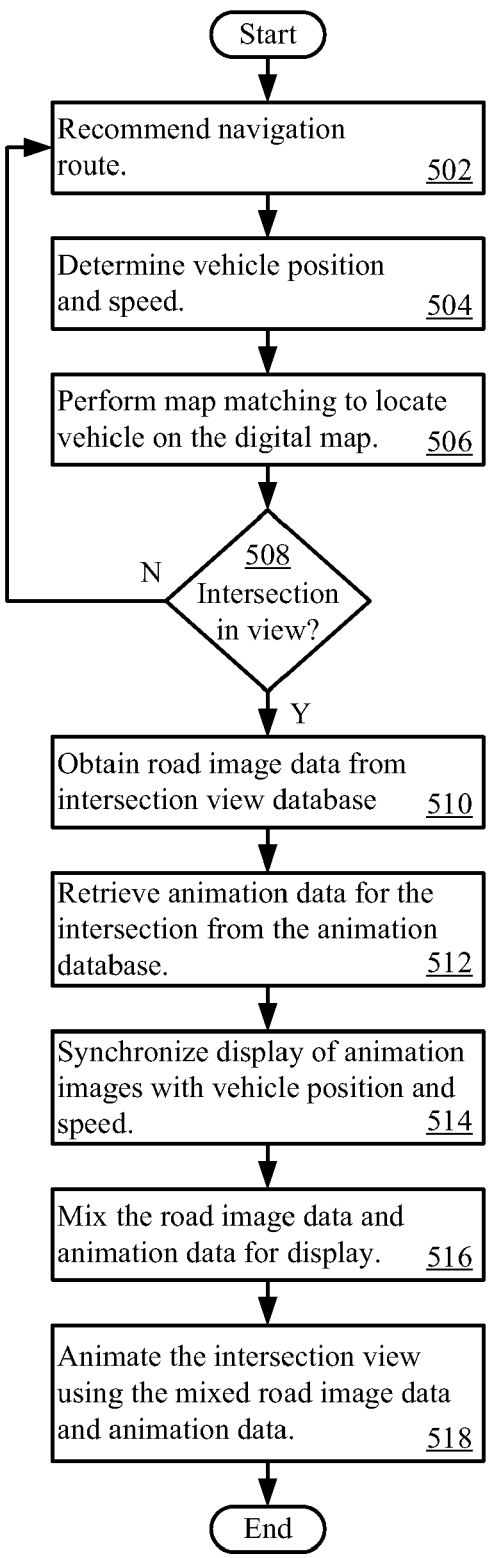
FIG. 5 shows the acts that a navigation system may take to provide an animated intersection view.

FIG. 5 illustrates example acts the navigation system may take to display an animated intersection view. The navigation system 100 recommends a navigation route for the driver (Act 502). The navigation system 100 may determine the position and speed of the vehicle (Act 504). To do so, the navigation system 100 may take into account data received by a GPS receiver, motion sensors, or other location and motion information sources.

The navigation system 100 may perform map matching (Act 506). The map matching precisely locates the vehicle on the digital map provided by the map database 104. Based on the information about the actual position of the vehicle and the driving direction, the navigation system may determine the geographical section in view of the driver. The navigation system 100 may determine whether an intersection is in view in the forward path of the vehicle (e.g., according to the recommended route and using map matching and the map database 104) (Act 508). If no intersection is in view, the navigation system 100 may continue to provide a recommended navigation route, and continue to determine the actual position and speed of the vehicle.

When an intersection comes into view, the navigation system 100 may reference the intersection view database 108 to obtain road image data and other parameters (Act 510). The parameters may include the number of lanes, information about the road geometry, street names, sign posts, warning signs, and other roadway parameters. Alternatively, the information may be provided by a navigation database 204.

In some systems, the intersection view database 108 may include references to the animation database 110 for a particular intersection. The navigation system may retrieve the animation data for the intersection from the animation database 110 (Act 512). The animation database 110 may include animation data of the street topology and topographical animation data as well as static bitmaps. The system 100 may determine the time at which each individual image of the animation data is to be displayed, based on the determination of the position and speed of the vehicle, to synchronize the display of the animation images with the vehicle position and speed (Act 514). The animation data may provide the driver with a perspective view of the upcoming intersection.

The navigation system 100 may mix static bitmaps and animation data (Act 516). The static bitmaps and animation data may be provided on different display layers. The navigation system may combine the display layers to form a composite resultant image for display. The animation player 124, a display device controller, or other logic, may mix and display the different display layers (Act 518).

Figure 6:
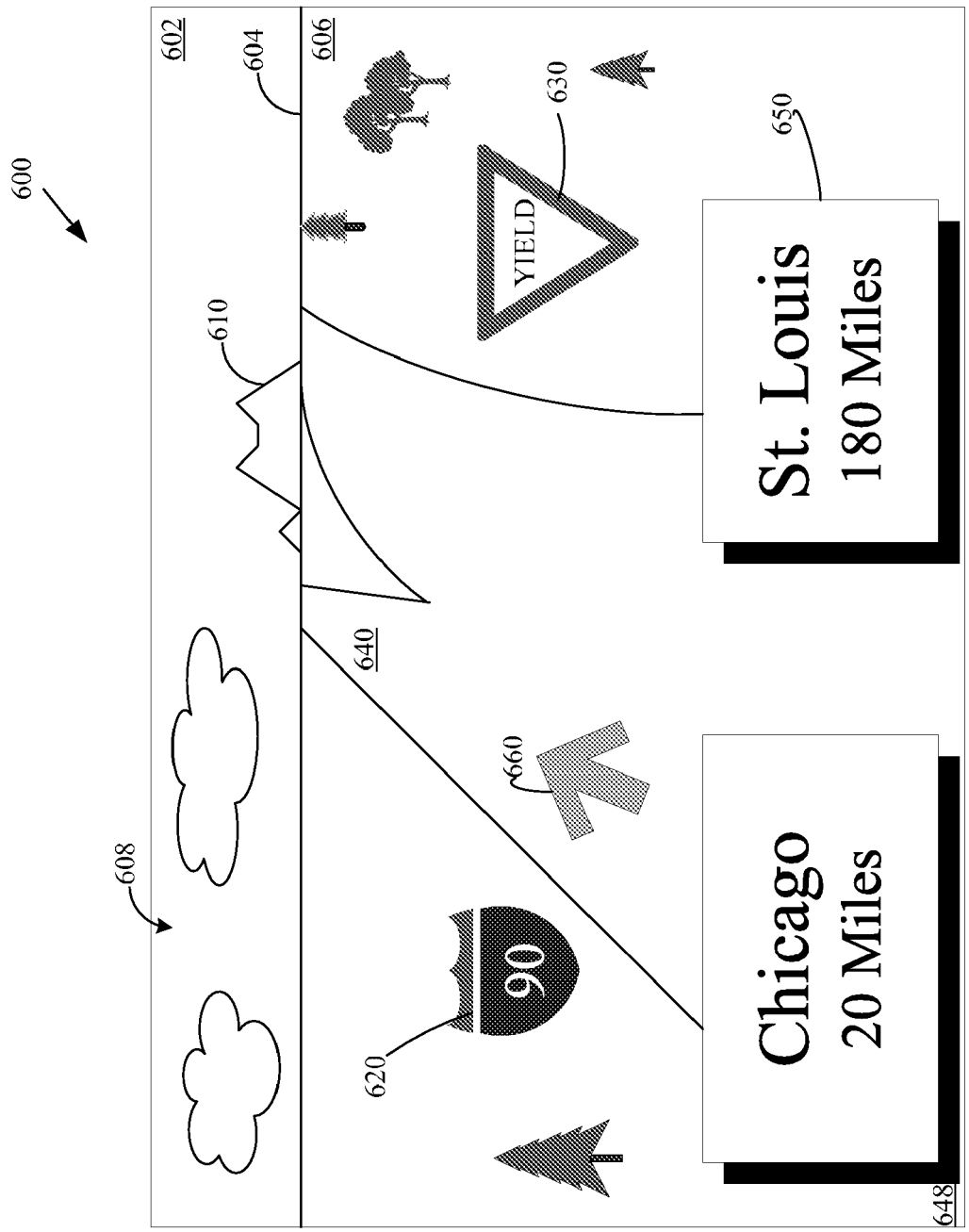
FIG. 6 illustrates a frame of an animated intersection view.

FIG. 6 illustrates an example frame 600 of an animated intersection view. The frame 600 includes a sky layer 602, a skyline layer 604, and a background display layer 606. The sky layer 602 may display a synthesized sky 608, for example as a static bitmap or other graphical representation. The skyline layer 604 may display a skyline 610 as a bitmap or other graphical representation. Topographical animation data may be included to represent traffic signs 620 and 630. The perspective view of the road geometry 640, as viewed from the actual position of the driver, may be animated by playing the animation data for the upcoming intersection. A foreground display layer 648 may show signposts 650 (e.g., as static bitmaps) including information related to transportation facilities, such as a train station, a bus station, airport locations or road exit information. Other directional or road signs, such as a railroad crossing sign, a speed limit sign, an arrow indicating a route to take, or an arrow indicating a one-way street direction may be displayed using static or animated graphics in the animation frame 600.

Animation of the intersection proceeds by adding, removing, and modifying the layers and the data presented in the frame. In some systems, the sky layer 602 may be updated to reflect changing weather conditions, time of day, or other conditions. The skyline layer 604 may be updated with different terrain and/or building information corresponding to the vehicle location. The foreground display layer 648 may be modified with different signposts 650 or directional indicators 660. All of the elements may be updated in real-time as travel progresses, updated on a periodic basis, or updated based on a user selection. The elements, such as the sky layer 602, the skyline layer 604, and the background display layer 606 may be based on intersection and road information related to road and intersection location.

Figure 7:
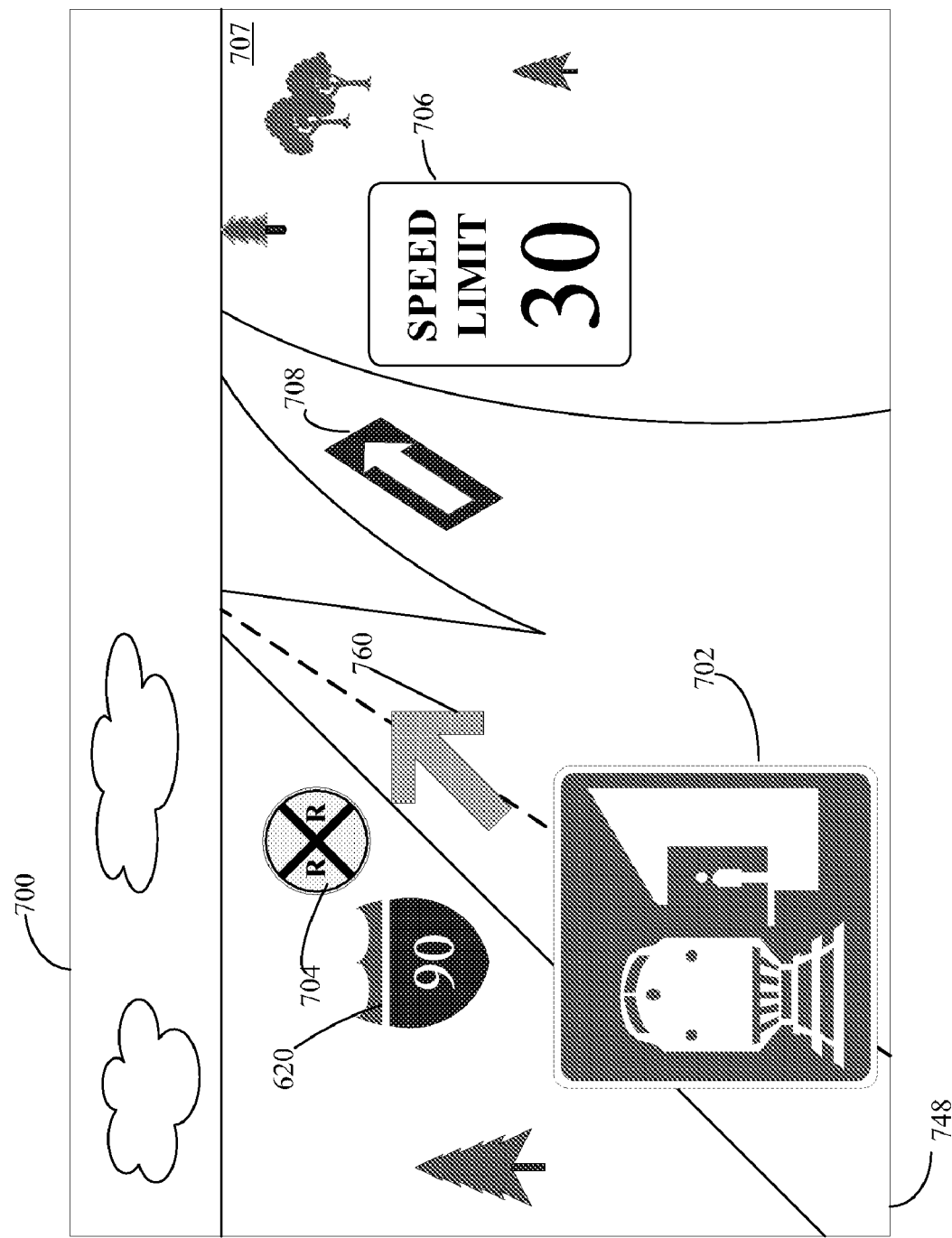
FIG. 7 illustrates a second frame of an animated intersection view.

FIG. 7 illustrates a second example animation frame 700. The animation frame 700 may represent a next frame in an animation sequence after animation frame 600. For example, as travel towards a destination progresses, the animation frame 700 may show updated signposts 702 in a foreground display layer 748 as static bitmaps. The intersection of roads displayed on a background display layer 707 may be displayed closer to the driver's perspective, indicating an approaching intersection. The signposts 702 may include information related to transportation facilities, such as a train station or bus station. Other directional or road signs, such as a railroad crossing sign 704 and a speed limit sign 706 may be displayed as bitmap images in the animation frame 700. Directional indicators, such as an arrow 760 indicating a route to take, or an arrow indicating a one-way street direction 708, may be displayed as well. The foreground display layer 748 and the background display layer 707 may be static, while other elements may be animated to indicate progress to the destination. Any layer may be animated or static, or may include both animated and static graphics. The layers may include photographs of image elements, or may include line drawings, vector graphics, polygons, polylines, bitmaps, graphics interchange format (.gif) files, joint photographic experts group (.jpg) files, or other graphic elements that may render layer elements.

Figure 8:
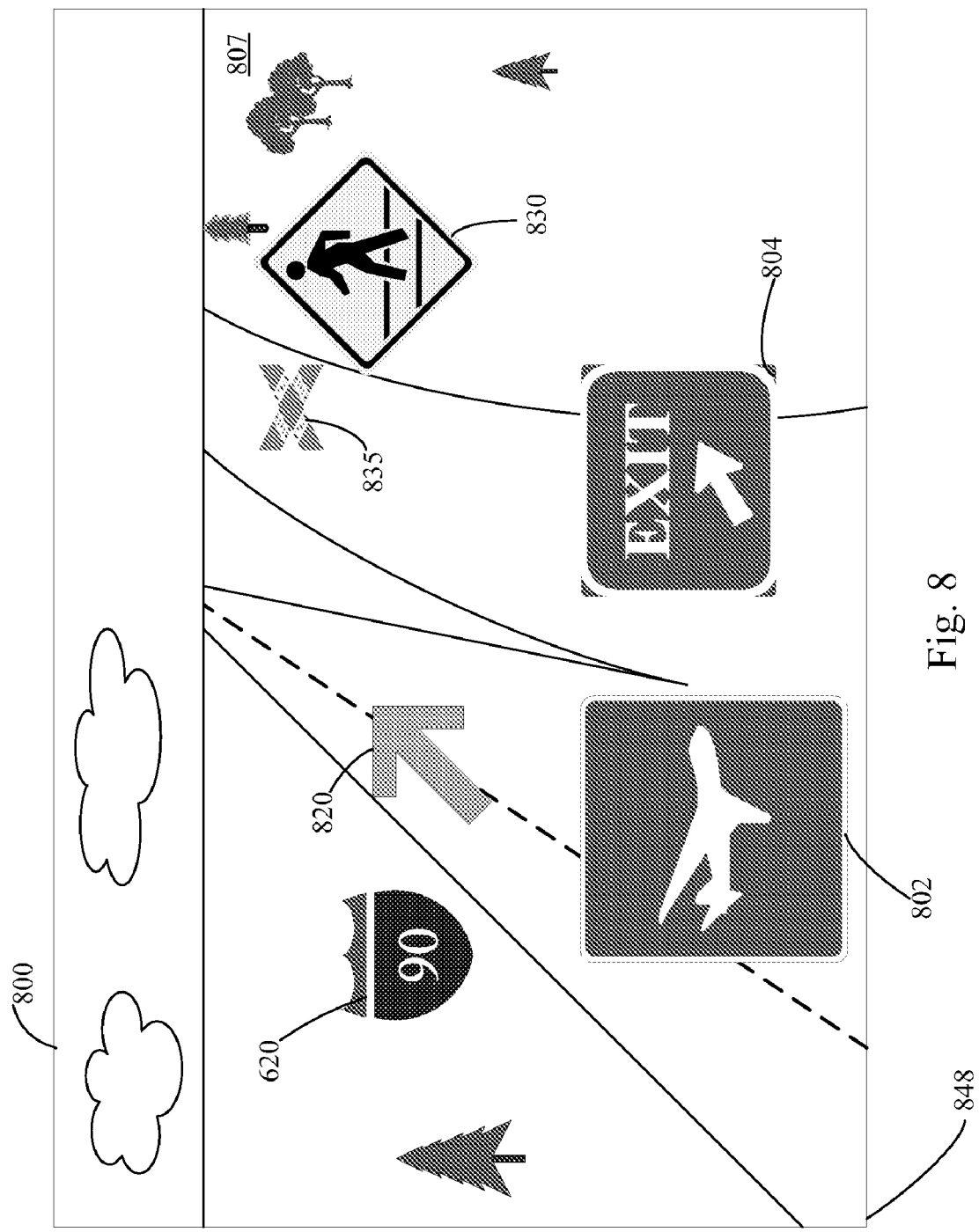
FIG. 8 illustrates a third frame of an animated intersection view.

FIG. 8 illustrates a third example animation frame 800. The animation frame 800 may represent another frame in an animation sequence after animation frame 600 and animation frame 700. In the animation frame 800, a background layer 848 may include signposts 802 and 804 as static bitmaps or animated sequences. The intersection of roads displayed on a background display layer 807 may be displayed closer to the driver's perspective, indicating an approaching intersection. The signposts 802 and 804 may depict travel information, such as airport locations or road exit information. Other road information may be displayed in the animation frame 800, such as street warning signs 830 and approaching pedestrian crosswalk indicators 835. The animation frame 800 may display directional indicators, such as an arrow 820 indicating a direction of travel. The background display layer 807 may be static, while other elements may be animated to indicate progress to the destination. Any layer may be animated or static, or may include both animated and static graphics.

Figure 9:
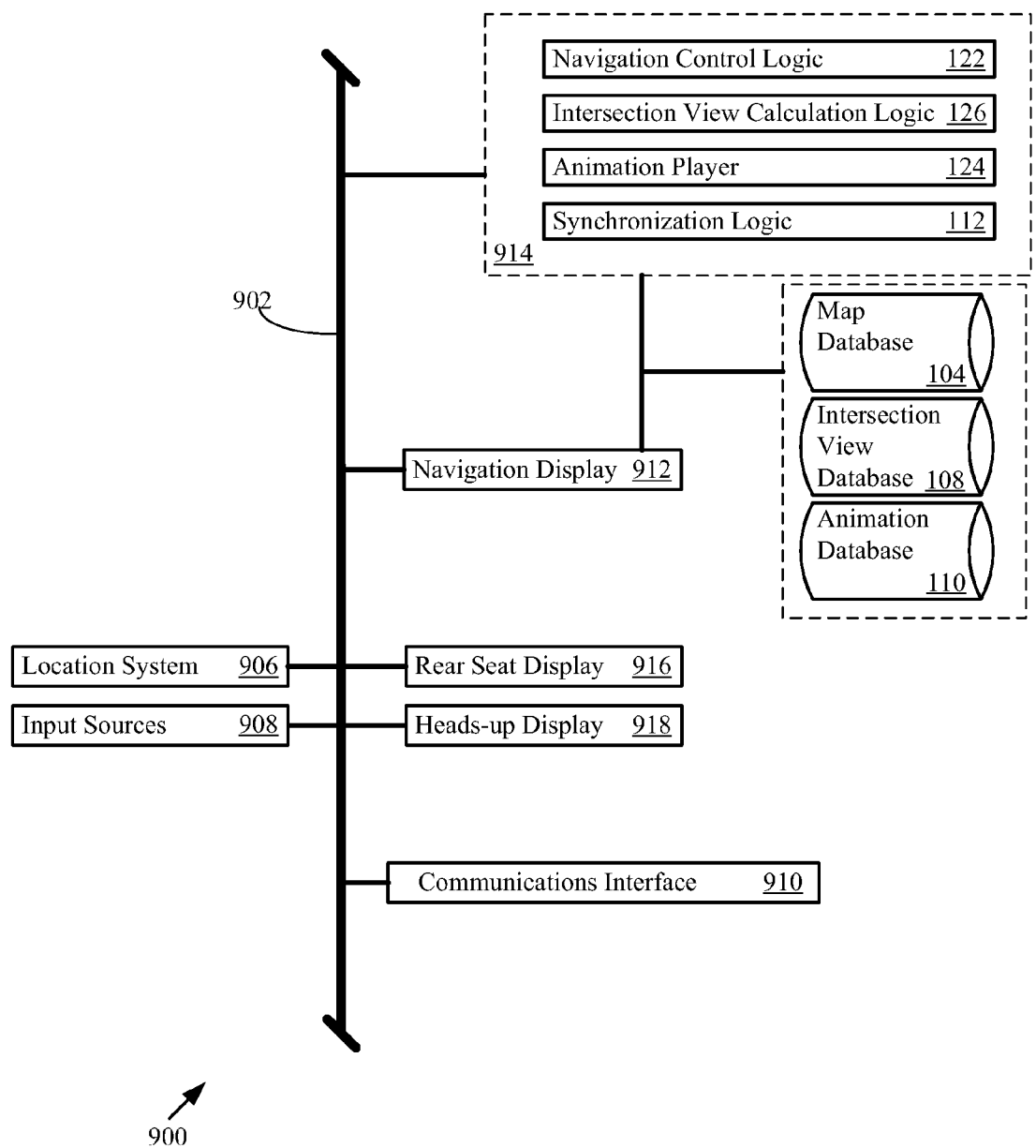
FIG. 9 illustrates a vehicle bus system.

FIG. 9 illustrates a vehicle electronics system 900 that interconnects vehicle electronics modules, such as a location system 906, a navigation display 912, a display processor 914, a rear seat display 916, and a heads-up display 918 through a vehicle system bus 902. The vehicle system bus 902 may adhere to the Local Interconnect Network (LIN), Controller Area Network (CAN), J1939, ISO11783, FlexRay, Media Oriented Systems Transport (MOST), Keyword Protocol 2000 (KWP2000), Vehicle Area Network (VAN), DC-BUS, IDB-1394. SMARTwireX, or other bus architecture. The vehicle system bus 902 may also connect to input sources 908. The input sources 908 may include user interface element inputs such as a voice recognition system input, switch, button, or other interface inputs, as well as video, audio, synchronization, data communication, or other signal inputs.

The vehicle bus system 900 may include a communications interface 910, such as a serial bus interface, to allow communication between the components interfaced to the vehicle system bus 902 and other components.

The display processor 914 may include navigation control logic 122, an animation player 124, intersection view calculation logic 126, and synchronization logic 112. The display processor 914 may also connect to the map database 104, the intersection view database 106, and the animation database 110.

By coupling the display processor 914 to the system bus 902, the vehicle bus system 900 may allow the display processor 914 to access electronics modules distributed throughout a vehicle. The vehicle bus system 900 may allow a passenger to specify flexible display of intersection views by responding to display selection inputs obtained through the input sources 908. In one implementation, the display processor 914 communicates video data, such as the animated intersection views, over the bus 902 to other displays in the vehicle. The additional displays may include the rear seat display 916, the windshield heads-up display 918, or any other display in the vehicle. As a result, vehicle passengers sitting anywhere in the vehicle may view upcoming intersection information and related navigation information, such as nearby restaurants or other places of interest.

Figure 10:
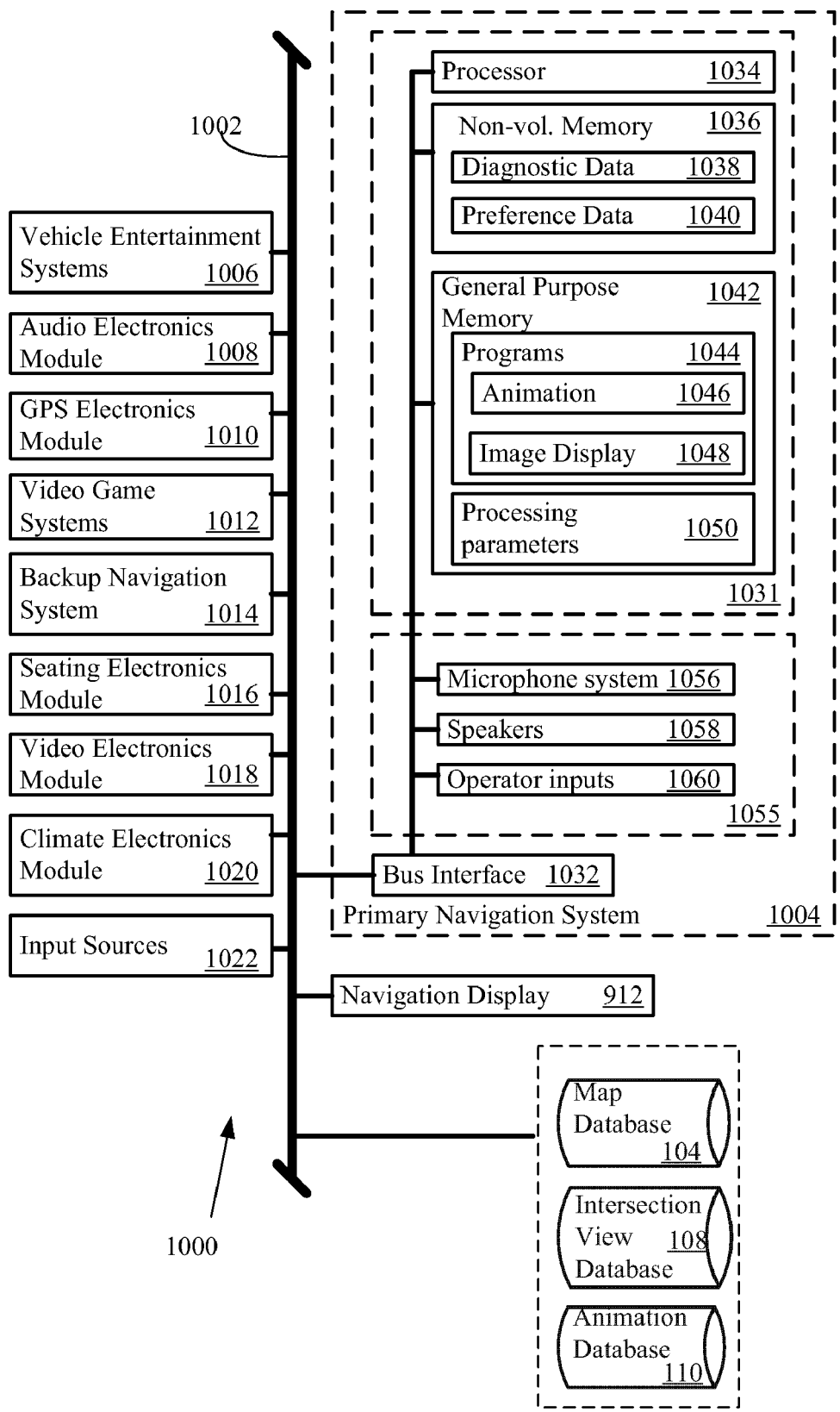
FIG. 10 illustrates a vehicle bus system.

FIG. 10 illustrates an example vehicle bus system 1000. The vehicle bus system 1000 may interconnect a diverse array of vehicle electronics modules through a vehicle system bus 1002. The vehicle electronics modules shown in FIG. 10 include a primary navigation system 1004, a vehicle entertainment system 1006, an audio electronics module 1008, a GPS electronics module 1010, video game systems 1012, a backup navigation system 1014, a seating electronics module 1016, a video electronics module 1018, a climate electronics module 1020, and input sources 1022.

The vehicle modules 1004-1020 may output video signals to the navigation display 912, and may access the navigation display 912 through the bus 1002. For example, the vehicle entertainment systems 1006 may include a DVD player, CD player, a video cassette player, portable music players, portable electronic devices, or mobile computers which may use the navigation display 912 for displaying video signals. The backup navigation system 1014 may output map data such as directional, location, or point of interest data to the navigation display 912. The video game systems 1012 may transmit a video signal to the navigation display 912. Any of the vehicle electronics modules, such as the audio electronics module 1008, the GPS electronics module 1010, the seating electronics module 1016, the entertainment and comfort module, or the climate electronics module 1020 may transmit a video and/or audio signal to the navigation display 912.

The primary navigation system 1004 may include a processing module 1031, an input/output module 1055, and a bus interface 1032. The processing module 1031 may include a processor 1034, a non-volatile memory module 1036, and a general purpose memory module 1042. The processor 1034 may include one or more processors, including special purpose processors such as graphics, video, DSP, or sound processors. The processor may be a microprocessor, a microcontroller, a DSP, an ASIC, an FPGA, or other integrated circuit device. The processor 1034 may implement static and/or animated output on the navigation display 912.

The non-volatile memory module 1036 may include diagnostic data 1038 and preference data 1040. Alternatively, the diagnostic data 1038 and the preference data 1040 may be stored in other memories coupled to the primary navigation system 1004. The diagnostic data module 1038 may store reference performance data, error checking data, or other operational validation information for the primary navigation system 1004. The preference data 1040 may include driver and/or passenger settings and preferences including whether to enable or disable animated intersection views, the distance from the intersection at which to initiate the animation, the types of static or dynamic images (e.g., road signs) to display, whether turn indicators are displayed in the animated view, or any other setting or preference. Additional examples of preference data 1040 include data related to playing intersection, animations with or without sound, animation frame speed or animation file type information, animation sound volume, language preferences, preferred animation frame layers or frame layer contents, and other intersection view preferences. The non-volatile memory module 1036 may be a flash memory, a floppy disk, hard disk drive, removable media such as DVD or CD, or other solid state memory device that retains data for a substantial period of time.

The general purpose memory module 1042 may include a programs module 1044, and a processing parameters module 1050. The programs module 1044 may include an animation program 1046 and an image display program 1048. Any of the modules or programs 1044-1050 may be stored in the general purpose memory module 1042 or other memories interfaced with the general purpose memory module 1042. The animation program 1046 may implement animated displays of intersections, including processing, formatting, and transmission of video files representing an animated frame display of intersection view. The image display program 1048 may implement static displays of intersection images and image elements, such as bitmap representations of signs, buildings, terrain, topography, skylines, warnings, and weather scenes.

The processing parameters module 1050 may store settings related to the input/output module 1055 or the bus interface 1032. The processing parameters module 1050 may also store additional operator preferences related to intersection animation for the input/output module 1055 or navigation display 912, such as display resolution, preferred video formats, sound settings, loudspeaker balance and steering, and other input/output settings.

The processing module 1031 may perform the functions of the display processor 914. For example, the processor 1034, in conjunction with one or more programs in the memories 1036 and 1042, may implement the animation player 124, the intersection view calculation logic 126, the navigation control logic 122, the synchronization logic 112, or other logic.

The input/output module 1055 may include a microphone system 1056, speakers 1058, such as loudspeakers or headphones, and operator inputs 1060. The microphone system 1056 may include noise-canceling microphones, directional microphones, or microphones interfaced to other devices which are coupled to the communications interface 1004 through the vehicle bus 1002. Operator inputs 1060 may be received from joysticks, touch pads, speech recognition units, haptic inputs, light pens, touch screen styli, touch screens, tablet screens, track balls, track pointers, mouse inputs, wired or wireless remote units, and other input devices that allow a user to input information into the primary navigation system 1004. The input module 1055 may allow a user to select or modify junction views, such as by initiating a junction view, requesting a specific frame layering for an intersection view, or inputting destination or route information.

The bus interface 1032 may include circuitry, software, firmware, source code, or object code configured to allow the primary navigation system 1004 to send or receive information from the modules 1006-1022 through the vehicle bus 1002. The bus interface 1032 may process data (e.g., bus packets) transmitted through the bus 1032 and may prioritize, route, delete, modify, or queue data or instructions transmitted through the vehicle bus 1002. Examples of system bus architecture include Local Interconnect Network (LIN), Controller Area Network (CAN), J1939, ISO11783, FlexRay, Media Oriented Systems Transport (MOST), Keyword Protocol 2000 (KWP2000), Vehicle Area Network (VAN), DC-BUS, IDB-1394 and SMARTwireX.

The processing described above may be implemented with a program stored in a signal bearing medium, a machine readable medium such as a memory, programmed within a device such as one or more integrated circuits, or processed by a controller or a computer. The program may reside in a memory resident to or interfaced to the processor 106 or 1034, a communication interface, or any other type of memory interfaced to or resident with the navigation system 100. The memory may include an ordered listing of executable instructions for implementing the processing described above. One or more of the processing acts may be implemented through digital circuitry, through source code, through analog circuitry, or through an analog electrical, audio, or video signal. The program may be embodied in any computer-readable or signal-bearing medium, for use by, or in connection with an instruction executable system, apparatus, or device. Such a system may include a computer-based system or other system that may selectively fetch and execute program instructions.

A "computer-readable medium," "machine-readable medium," "propagated-signal" medium, and/or "signal-bearing medium" may include any medium that contains, stores, communicates, propagates, or transports programs for use by or in connection with an instruction executing system, apparatus, or device. The machine-readable medium may be an electronic, magnetic, optical, electromagnetic, infrared, or semiconductor system, apparatus, device, or propagation medium. A non-exhaustive list of examples of a machine-readable medium includes: a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A vehicle navigation system comprising:
 a location system operable to determine a vehicle location;
 a database comprising intersection animation data for an intersection and static image data for the intersection;
 a processor coupled to the location system and the animation database, the processor operable to determine that a vehicle is approaching the intersection based on the vehicle location, and in response to the determination that the vehicle is approaching the intersection based on the vehicle location, the processor initiates play of the intersection animation data on a first display layer, and renders the static image data on a second display layer; and
 synchronization logic which synchronizes play of the intersection animation data with the vehicle location in response to the determination that the vehicle is approaching the intersection based on the vehicle location.

2. The navigation system of claim 1, further comprising:
 a map database comprising a digital map, and where the processor initiates play of the intersection animation data mixed with the digital map.

3. The navigation system of claim 2, further comprising:
 an intersection view database comprising a point-of-interest bitmap, and where the processor initiates play of the intersection animation data mixed with the point-of-interest bitmap.

4. The navigation system of claim 1, further comprising:
 an intersection view database comprising an intersection bitmap of the intersection and a database reference which links the intersection bitmap to the intersection animation data.

5. A method for navigating, the method comprising:
 determining a vehicle location;
 determining that a vehicle is approaching an intersection based on the vehicle location;
 retrieving intersection animation data for the intersection, where the intersection animation data includes intersection view data and static image data based on the intersection;
 synchronizing play of the intersection animation data with the vehicle location in response to the determination that the vehicle is approaching the intersection based on the vehicle location; and
 in response to the determination that the vehicle is approaching the intersection based on the vehicle location, initiating play of the intersection view data for the intersection on a first display layer and rendering the static image data on a second display layer.

6. The method of claim 5, further comprising:
 synchronizing play of the intersection animation data with the vehicle location based on a distance between views of the intersection represented in frames of the intersection animation data.

7. The method of claim 5, further comprising:
 retrieving a point-of-interest bitmap based on the vehicle location; and
 mixing the point-of-interest bitmap with the intersection animation data.

8. The method of claim 7, further comprising:
 placing the intersection animation data in a first display layer;
 placing the point-of-interest bitmap on a second display layer; and
 combining the first and second display layers for presentation.

9. A computer program product comprising:
 a non-transitory computer readable medium having computer readable code embodied in the medium, the computer readable code comprising:
 computer readable code executable to determine a vehicle location;
 computer readable code executable to determine that a vehicle is approaching an intersection based on the vehicle location;
 computer readable code executable to retrieve intersection animation data for the intersection, where the intersection animation data includes intersection view data and static image data based on the intersection;
 computer readable code executable to synchronize play of the intersection animation data with the vehicle location in response to the determination that the vehicle is approaching the intersection based on the vehicle location;

computer readable code executable to initiate play of the intersection view data for the intersection on a first display layer in response to the determination that the vehicle is approaching the intersection based on the vehicle location; and computer readable code executable to render the static image data on a second display layer in response to the determination that the vehicle is approaching the intersection based on the vehicle location.

10. The computer program product of claim 9 further comprising computer readable code executable to synchronize play of the intersection animation data with the vehicle location based on a distance between views of the intersection represented in frames of the animation data.

11. The computer program product of claim 9 further comprising:

computer readable code executable to retrieve a point-of-interest bitmap based on the vehicle location; and computer readable code executable to mix the point-of-interest bitmap with the intersection animation data.

12. The computer program product of claim 11 further comprising:

computer readable code executable to placing the intersection animation data in a first display layer;

computer readable code executable to place the point-of-interest bitmap on a second display layer; and computer readable code executable to combine the first and second display layers for presentation.

13. A navigation apparatus comprising:

means for determining a vehicle location;

means for determining that a vehicle is approaching an intersection based on the vehicle location;

means for retrieving intersection animation data for the intersection, where the intersection animation data includes intersection view data and static image data based on the intersection;

means for synchronizing play of the intersection animation data with the vehicle location in response to the determination that the vehicle is approaching the intersection based on the vehicle location; and means for initiating play of the intersection view data for the intersection on a first display layer and rendering the static image data on a second display layer in response to the determination that the vehicle is approaching the intersection based on the vehicle location.

14. The navigation apparatus of claim 13 further comprising means for synchronizing play of the intersection animation data with the vehicle location based on a distance between views of the intersection represented in frames of the animation data.

15. The navigation apparatus of claim 13 further comprising:

means for retrieving a point-of-interest bitmap based on the vehicle location; and means for mixing the point-of-interest bitmap with the intersection animation data.

16. The navigation apparatus of claim 15 further comprising:

means for placing the intersection animation data in a first display layer;

means for placing the point-of-interest bitmap on a second display layer; and means for combining the first and second display layers for presentation.

\* \* \* \* \*

UNITED STATES PATENT AND TRADEMARK OFFICE
CERTIFICATE OF CORRECTION

| | | |
|---|---|---|
| PATENT NO. | : 8,170,795 B2 | Page 1 of 1 |
| APPLICATION NO. | : 11/462306 | |
| DATED | : May 1, 2012 | |
| INVENTOR(S) | : Brülle-Drews et al. | |

It is certified that error appears in the above-identified patent and that said Letters Patent is hereby corrected as shown below:

At column 5, line 6, "...reference 107, 109, and 203..." should be changed to -- references 107 and 109 (FIG. 1) and 203 --

At column 5, line 8, "...databases 104, 108, 110, and 204..." should be changed to -- databases 104, 108, and 110 (FIG. 1) and 204 --

At column 5, lines 18–19, "...images and animation database 250..." should be changed to -- images and animation database 202 --

At column 5, line 52, "...navigation database 205..." should be changed to -- navigation database 204 --

At column 7, line 16, "...of the vehicle." should be changed to -- of the vehicle (Act 502). --

At column 7, line 26, "The navigation system may..." should be changed to -- The navigation system 100 may --

At column 9, line 9, "intersection view database 106..." should be changed to -- intersection view database 108 --

At column 10, line 52, "...the communications interface 1004" should be changed to -- the primary navigation system 1004 --

At column 11, line 1, "...the bus 1032..." should be changed to -- the bus 1002 --

At column 13, line 24, claim 15, "...code executable to placing..." should be changed to -- code executable to place --

Signed and Sealed this
Twenty-ninth Day of January, 2013

David J. Kappos
*Director of the United States Patent and Trademark Office*